3,708,519
PROCESS FOR THE PREPARATION OF AN ANHYDROUS ALKALI METAL SALT OR A p-HYDROXYBENZOIC ACID ESTER
Saburo Senoo, Tokyo, Toshio Kato, Ohmiya, and Hiroshi Kimura, Tokyo, Japan, assignors to Asahi Kasei Kogyo Kabushiki Kaisha, Kita-ku, Osaka, Osaka Perfecture, Japan
No Drawing. Filed Feb. 4, 1969, Ser. No. 796,553
Claims priority, application Japan, Apr. 18, 1968, 43/25,506
Int. Cl. C07c 69/78
U.S. Cl. 260—473 S          5 Claims

ABSTRACT OF THE DISCLOSURE

A process for the preparation of an anhydrous alkali metal salt of a p-hydroxybenzoic acid ester which comprises contacting a p-hydroxybenzoic acid ester with a corresponding alkali metal hydroxide solution to effect neutralization thereof to obtain a crystalline alakali metal salt hydrate of a p-hydroxybenzoic acid ester by cooling or concentrating the solution and subsequently drying the resulting crystalline hydrate at a temperature below the melting point thereof. Thus it has become possible to prepare an anhydrous alkali metal salt of a p-hydroxybenzoic acid ester at a low cost which allows its practical use in an industrial scale.

---

This invention relates to a process for the preparation of an anhydrous alkali metal salt of a p-hydroxybenzoic acid ester. More particularly, this invention relates to a process for the preparation of an anhydrous alkali metal salt of a p-hydroxybenzoic acid ester which comprises contacting a p-hydroxybenzoic acid (hereinafter referred to simply as "POB") ester with an alkali metal hydroxide solution thereby to effect neutralization thereof to form a crystalline alkali metal salt hydrate of a POB ester by cooling or concentrating the solution and subsequently drying the resulting crystalline hydrate at a temperature below the melting point thereof.

Although the use of anhydrous alkali metal salts of POB ester is often required, there has heretofore been no process for easily preparing anhydrous alkali metal salts of a POB ester at low cost.

For example, the maintenance of the reaction system in an anhydrous state during the course of the reaction is required in the so-called Williamson reaction [A. W. Williamson; J. Chem. Soc., 4, 229 (1852)] which consists in reacting an alkali metal salt of POB ester with a hydrocarbon halide or hydrocarbon dihalide to produce an alkoxybenzoic acid ester or alkylenedioxy-bis (benzoic acid ester). E.g., in the manfacture of 4,4'-ethylenedioxy-bis(methyl benzoate) (hereinafter referred to simple as "methyl-EBA") which comprises reacting methyl-POB with ethylene dichloride in methanol in the presence of caustic alkali, it is difficult to obtain the desired product in a yield of more than 30% even under an optimum reaction condition. This difficulty is due to the formation of 1 mole of water by the neutralization of methyl-POB with caustic alkali. The water thus formed causes not only the hydrolysis of the materials and their product but also the side reaction including substitution of a chlorine atom of 4-(2-chloroethyloxy) benzoic acid ester which is formed as an intermediate with a hydroxyl group. The above-mentioned fact will be clearly understood from the following Table 1 and Table 2 in which are shown the states of the decomposition of the ester groups of sodium salts of methyl-POB and methyl-EBA under several reaction conditions, respectively.

TABLE 1.—RATE OF DECOMPOSITION OF THE ESTER GROUP OF SODIUM SALT OF METHYL-POB IN METHANOL CONTAINING WATER (AT 120° C.)

| Reaction time (hours) | 0.5 | 1.0 | 2.0 |
|---|---|---|---|
| Rate of decomposition (percent) | 7 | 10 | 15 |

NOTE.—Methyl-POB 0.1 mol.; NaOH 0.1 mol.; CH₃OH 50 ml.

TABLE 2.—RATE OF DECOMPOSITION OF THE ESTER GROUP OF METHYL-EBA IN METHANOL CONTAINING WATER (AT 120° C.)

| Reaction time (hours) | 0.5 | 1.0 | 2.5 |
|---|---|---|---|
| Rate of decomposition (percent) | 30 | 41 | 62 |

NOTE.—Methyl-EBA 0.05 mol.; methyl-POB 0.1 mol.; NaOH 0.1 mol.; CH₃OH 50 ml.

In order to avoid the adverse effect of water during the course of reaction, heretofore there has in general been employed a process which comprises reacting a POB ester with an alkali metal alcoholate to produce the alkali metal salt of the POB ester and subsequently reacting the resulting alkali metal salt with a hydrocarbon halide to obtain an alkoxybenzoic acid ester [J. Org. Chem. 26, 474 (1961)]. However, it is apparent that it is difficult to carry out in an industrial scale such process employing an alkali metal which is expensive.

Therefore, one and principal object of the present invention is to provide an industrially available process for the preparation of an anhydrous alkali metal salt of a POB ester which can be easily carried out at a low cost.

According to the present invention, a desired anhydrous alkali metal salt of POB ester can be obtained with ease by contacting a POB ester with a caustic alkali such as caustic soda or caustic potash in a suitable medium thereby to effect neutralization thereof to form an alkali metal salt hydrate of the POB ester and subsequently drying the resulting hydrate at a temperautre range in which the hydrate crystal does not melt.

In the process according to the present invention, the medium which is employed in the reaction system for obtaining the alkali metal salt hydrate of the POB ester should be a solvent capable of suffiicently dissolving the above-mentioned caustic alkali and may be, for example, water.

The alkali metal salt hydrate of the POB ester which is obtained by neutralization through contacting the POB ester with the caustic alkali in the above-mentioned solvent is preferably collected as crystals by filtration by utilizing the difference in solubility due to temperature. In some cases, the alkali metal salt hydrate of the POB ester can be isolated by, after neutralization, by distilling off the solvent at a low temperature range in which the ester does not decompose to effect concentration.

The hydration number of the hydrate obtained by the above-mentioned process varies generally depending on the kind of the solvent employed, the water content of the solvent and the concentration of the alkali metal salt of the POB ester. In some cases, there may be contained in the hydrate the solvent in addition to water. Stated illustratively, the solubility characteristics curve in the case where the sodium salt of the methyl-POB is crystallized from water can readily be illustrated from the following Table 3. The crystals precipitated under the temperature and concentration conditions in the range shown in the same table contains approximately 6 mol. of water of crystallization (Cryohydric point: −4° C.). On the other hand, the relationship between the water content of methanol and the hydration number of the crystal crystallized therefrom in the case where the crystal is crystallized from water-containing methanol is shown in the following Table 4. In this case, it has been discovered that the crystals contain crystalline methanol.

TABLE 3.—SOLUBILITY OF THE SODIUM SALT OF METHYL-POB

| Temperature (° C.) | 3.0 | 10.8 | 23.5 | 38.0 | 58.5 |
|---|---|---|---|---|---|
| Solubility | 27.0 | 35.9 | 58.4 | 67.1 | 85.9 |

TABLE 4.—CONDITION OF CRYSTALLIZATION OF THE SODIUM SALT OF METHYL-POB FROM WATER-CONTAINING METHANOL AND THE HYDRATION NUMBER OF THE CRYSTAL CRYSTALLIZED THEREFROM

| Amount of CH₃OH (grams) | Amount of water (grams) | Filtration temperature of crystal °C. | Amount of crystal (grams) | Hydration Number |
|---|---|---|---|---|
| 105.8 | 10 | −4 | 24.7 | 1.93 |
| 95.8 | 20 | −10 | 37.1 | 2.54 |
| 75.8 | 40 | −10 | 43.0 | 2.74 |
| 79.5 | 60 | −5 | 22.5 | 2.55 |

NOTE.—Methyl-POB 60.8 grams; NaOH 16.4 grams.

With regard to the drying of the alkali metal salt hydrate of POB ester, the explanation will be made in the following.

In general, an ester group is hydrolyzed in an aqueous alkaline solution to produce a free acid and an alcohol. The aqueous solution of the alkali metal salt of POB ester is similarly decomposed at a considerably high rate due to its strong alkalinity. For example, in the saturated aqueous solution of the sodium salt of methyl-POB, the decomposition rates of the ester after 5 hours and after 20 hours are 10% and 17%, respectively. With regard to the sodium salt of methyl-POB and methyl-EBA, the decomposition rates of such esters in water-containing methanol are as shown in Table 1 and Table 2.

However, it is noted that the alkali metal salt hydrate of POB ester in the crystalline form is very stable on heating with respect to the ester linkage thereof and, therefore, can be converted to the anhydrous alkali metal salt of POB ester without undergoing any hydrolysis on drying at a high temperature of 100° C. or more under the condition of non-melting of the crystals.

For the purpose of examining the sodium salt hydrate of methyl-POB with regard to its property when subjected to heat, said sodium salt hydrate was subjected to a drying operation at normal temperature under reduced pressure to distill off the moisture adhered to the surface of crystals (in this instance, the hydration number of the crystal was reduced to 5.96, as compared with 6.08 at the time immediately after the centrifugal filtration), and subsequently was subjected to the drying by a heated gas stream at 120° C. under normal pressure. Then, the change following the passage of the drying time with regard to the water content and hydrolysis of the ester linkage thereof was examined. The results are shown in Table 5.

TABLE 5.—CHANGE OF THE SODIUM SALT HEXAHYDRATE OF METHYL-POB ON DRYING BY A HEATED GAS STREAM AT 120° C. UNDER NORMAL PRESSURE WITH RESPECT TO WATER CONTENT AND HYDROLYSIS OF THE ESTER LINKAGE THEREOF

| Drying time (hours) | 0 | 0.5 | 3.5 |
|---|---|---|---|
| Rate of hydrolysis | 0 | 0 | 0 |
| Water content H₂O (mol.)/sodium salt of methyl-POB (mol.) | 5.96 | 3.09 | 0.019 |

It is unknown why the water contained in crystals of such compound having strong alkalinity does not decompose the ester linkage in the molecule under the above-mentioned condition. However, it is presumed to be possibly due to the reason that the cation and anion are fixed in the crystal lattice and, therefore, cannot function as catalysts for hydrolysis.

As to the drying of the hydrate crystal, there may be employed either a mode wherein after the crystals are preliminarily dried under reduced pressure the final drying is effected at a high temperature under normal pressure, or another mode wherein the drying is from the beginning effected under normal pressure. In any way, it is an essential point that the drying operation should be effected under the condition in which the hydrate crystal maintains its form of crystal during drying, to wit, at a temperature below the melting point of the hydrate crystal.

The melting point of the alkali metal salt hydrate of POB ester varies depending on the drying process as well as the drying condition.

Crystals which are crystallized from the above-mentioned aqueous solution and which contain some adhering free moisture immediately after being collected by the centrifugal filtration will partly melt in the gas stream heated to 80 to 90° C., accompanied by the decomposition or cleavage of the ester linkage. However, when crystals collected by the filtration are preliminarily subjected to drying at normal temperature under reduced pressure to adjust the form of crystal, they are capable of withstanding drying by the gas stream heated to 120° C. Moreover, it is noted that, when the filtered crystals are sufficiently dried under reduced pressure so that the hydration number is reduced to approximately 2, they can withstand higher temperatures of 130 to 140° C. without melting as well as decomposition and, therefore, the drying of same can be completed in a short time without undergoing any unfavorable change.

Accordingly, the upper limit of the temperature at which the crystals can be subjected to the drying immediately after filtration is approximately 80° C. The decomposition at the beginning of the drying operation conducted at a temperature higher than said critical starting drying temperature is not negligible. This decomposition at the beginning of the drying operation occurs for an exceedingly short time until the adhering free moisture on the surface of crystal is evaporated to bring about the stabilization of the form of crystal.

As is apparent from the foregoing description, it is desirable for the preparation of an anhydrous alkali metal salt of a POB ester under the stable condition in which the cleavage or decomposition of the ester-linkage does not occur throughout the drying operation that the drying is deliberately conducted at the beginning thereof at a relatively low temperature so as not to melt or fix the crystal and then, the temperature is gradually raised in accompaniment with the decrease in water of crystallization.

Accompanying the decrease in the hydration number of the crystal the equilibrium vapor pressure drops exceedingly to cause a decrease in the rate of drying. Therefore, it is desirable to raise the drying temperature at the end of the drying operation, thereby enabling the period of time required for the drying to be shortened.

When the drying of the alkali metal salt hydrate of POB ester is conducted under reduced pressure, the melting of the crystal and the decomposition accompanying it at the beginning of drying are hardly recognized. Therefore, the drying operation can be conducted under very stable condition.

According to the present invention, the production of the crystal containing water and the drying operation can be conducted separately as mentioned above, while both the processes can also be consecutively conducted in a single apparatus. In the latter case, for example, the alkali metal salt of POB ester is prepared in an evaporation concentrating apparatus and the resulting soution is concentrated under normal or reduced pressure to precipitate the crystal. After the solvent is disilled off to dryness to obtain the alkali salt hydrate of POB ester as crystals, the drying operation is consecutively conducted under normal or reduced pressure. Meanwhile, it is also possibe to employ a process wherein the concentration-crystallization and the drying to some extent are simultaneously carried out by utilizing a spray dryer or the like, and subsequently the final and complete drying is effected.

The following examples are given solely for the purpose of illustration and are not to be construed as limitations of this invention, many variations of which are possible without departing from the spirit or scope thereof.

EXAMPLE 1

In 3 l. of water were dissolved 400 g. of NaOH (97% purity), to which were added 1,394 g. of methyl-POB. The mixture was stirred to effect dissolution thereof. In this instance, the temperature of the resuting solution rose by several degrees centigrades to 30° C. The solution was cooled to 30° C., at which the solution was maintained for 15 hours to crystallize the sodium salt hydrate of methyl-POB. The filtration was effected by employing a centrifugal separator to obtain 1,410 g. of crystal. The water content of the crystal was measured by a Karl-Fischer's water content measuring instrument. As a result, it was determined that there were contained 6.24 mol. of water per mol. of sodium salt of methyl-POB. As a result of the determination of the sodium salt of methyl-POB in the crystal by the pH titration method, it was found that in this process the yield of the crystal was 57.7%, based on the amount of the methyl-POB-employed as a starting material. 150 g. of the crystals thus obtained were taken into a glass dish having a diameter of 14 cm., and were allowed to stand in a small box type drying apparatus utilizing a heated gas stream to effect the drying. The substantially anhydrous sodium salt of methyl-POB was obtained after 11 hours through the drying record as shown below.

| Drying temperature [1] | Drying time (hours) | Hydration Number |
|---|---|---|
|  | 0 | 6.24 |
| 34 | 3.0 | 4.57 |
| 57 | 4.75 | 3.20 |
| 76 | 6.25 | 2.67 |
| 97 | 8.0 | 1.78 |
| 122 | 9.5 | 0.70 |
| 140 | 11.0 | 0.007 |

[1] Temperature of heated gas stream (° C.).

EXAMPLE 2

1.7 kg. of the sodium salt hydrate of methyl-POB (hydration number 6.46; yied 51.4%) crystallized under substantially the same condition as described in Example 1 were spread out in three metallic sieves having a diameter of 20 cm. so as to make a layer having a thickness of approximately 5 cm. and then were allowed to stand in a heated gas stream type drying apparatus having a size of 30 x 30 x 30 cm. The drying was effected by the heated gas (at a rate of 150 l./min.) under the conditions shown hereunder. The substantially anyhdrous sodium salt of methyl-POB was obtained after 13 hours. The rate of the decomposition of ester was nearly zero.

| Temperature of heated gas (° C.) | Drying temperature (hours) | Hydration Number |
|---|---|---|
|  | 0 | 6.46 |
| 30 | 6.5 | 2.7 |
| 64 | 7.5 |  |
| 115 | 9.0 | 2.1 |
| 130 | 13.0 | 0.009 |

EXAMPLE 3

Form 4 l. of water, 600 g. of caustic soda and 2,161 g. of methyl-POB were, in the same manner as described in Example 1, obtained 2,240 g. of sodium salt hydrate of methyl-POB. As a result of the water content measurement, it was found that there were contained 6.50 mol. of water per mole of sodium salt of methy-POB. The crystals were obtained in a yield of 65%. The crystals thus obtained were put in an iron vat placed in a cylindrical (35 x 40 cm.) vacuum heating drying apparatus on a shelf at its central portion and spread out so as to have a thickness of approximatey 3 cm. It was allowed to stand to effect the vacuum drying at a temperature of 100 to 140° C. under reduced pressure of 15 mm. Hg for 18 hours. There were obtained a sodium salt of methyl-POB of which the water content was 0.6% by weight. The rate of the decomposition of ester was nearly zero.

What is claimed is:
1. A process for the preparation of an anhydrous alkali metal salt of a p-hydroxybenzoic acid lower alkyl ester which comprises:
    (1) dissolving a p-hydroxybenzoic acid lower alkyl ester in a sufficient quantity of a solution of an alkali metal hydroxide in water to effect neutralization thereof and to form an aqueous solution of the alkali metal salt of said p-hydroxybenzoic acid lower alkyl ester;
    (2) treating said aqueous solution to cause separation therefrom of crystals of alkali metal salt hydrate of said ester; and then
    (3) drying said crystals by heating them at an elevated temperature below about 80° C. to remove adhering free water and to stabilize the crystals, and then raising the drying temperature above 80° C. to remove water of crystallization from the crystals and gradually raising the temperature as the water of crystallization content of the crystals decreases to a maximum temperature of not in excess of about 140° C., while at all times maintaining the drying temperature below the melting point of the crystals.

2. A process according to claim 1, in which the alkali metal is selected from the group consisting of sodium and potassium.

3. A process according to claim 1, in which said crystals are separated from said aqueous solution by cooling the reaction mixture of step (1) to precipitate said crystals and then filtering the reaction mixture to remove said crystals therefrom.

4. A process according to claim 1, in which said crystals are separated from said aqueous solution by evaporating water from the reaction mixture of step (1).

5. A process according to claim 1, in which the drying is carried out by flowing a heated gas stream through a thin layer of said crystals.

References Cited

UNITED STATES PATENTS 2,312,0001   2/1943   Sabalitschka _____ 260—473

OTHER REFERENCES

Vogel: "Practical Organic Chemistry," John Wiley & Sons, Inc. (1962), pp. 136–137.

Weast ed.: "CRC Handbook of Chemistry and Physics, Chemical Rubber Co. (1969), p. B 158.

LORRAINE A. WEINBERGER, Primary Examiner

J. F. TERAPANE, Assistant Examiner